(12) United States Patent
Mähner

(10) Patent No.: US 6,577,383 B1
(45) Date of Patent: Jun. 10, 2003

(54) METHOD OF DETERMINING STRUCTURAL FEATURES OF TEST PIECES HAVING A RANDOMLY SCATTERING SURFACE

(76) Inventor: Bernward Mähner, Daisenbergerstrasse 1, D-83607, Holzkirchen (DE)

( * ) Notice: Subject to any disclaimer, the term of this patent is extended or adjusted under 35 U.S.C. 154(b) by 0 days.

(21) Appl. No.: 09/505,884

(22) Filed: Feb. 17, 2000

(30) Foreign Application Priority Data

Feb. 18, 1999 (DE) .......................... 199 06 681

(51) Int. Cl.$^7$ ................................. G01L 1/24
(52) U.S. Cl. ...................................... 356/35.5
(58) Field of Search ................. 356/457, 458, 356/35.5; 73/800; 382/265, 264, 141

(56) References Cited

U.S. PATENT DOCUMENTS 5,481,356 A * 1/1996 Pouet et al. ............... 356/35.5

FOREIGN PATENT DOCUMENTS

| DE | 38 43 396 | 7/1990 |
| DE | 40 13 309 | 10/1991 |
| DE | 195 01073 | 8/1996 |
| DE | 196 39213 | 3/1998 |
| EP | 0 331 274 | 9/1989 |

OTHER PUBLICATIONS

Osten, "Digitale Verarbeitung und Auswertung von Interferenzbildern", Akademie Verlag, Chapter 6, 1991, pp. 124–146.
Nakadate et al, "Fringe scanning speckle–pattern interferometry", Applied Optics, vol. 24, Jul. 1985, pp. 563–571.

* cited by examiner

Primary Examiner—Samuel A. Turner
Assistant Examiner—Patrick Connolly
(74) Attorney, Agent, or Firm—Venable, LLP; Norman N. Kunitz

(57) ABSTRACT

Optical methods for the testing of component areas by using interferometric techniques or processes using structured light, which compute the deformation of the object by means of the picture processing and display the result as a phase difference picture are known. The structure-dependent local deformations are frequently superimposed by whole-body movements or other non-relevant global object deformations, which make it difficult to recognize local structural features, particularly structural defects. With the new picture processing method, the phase difference picture is manipulated in such a way that the local structural features are removed. This manipulated phase difference picture is subtracted from the original phase difference picture, so that a phase difference picture results, which shows only the local deformations. It is then much easier to recognize structural features, particularly structural defects, in the resulting phase difference picture since the interfering, superimposed global deformations are removed.

11 Claims, 8 Drawing Sheets

Section A

Section B

Section C

METHOD OF DETERMINING STRUCTURAL FEATURES OF TEST PIECES HAVING A RANDOMLY SCATTERING SURFACE

BACKGROUND OF THE INVENTION

The invention relates to a method of determining structural features, in particular structural defects, of test objects having a randomly scattering surface.

It is known that streak-projection methods, such as the Moiré Technique and interferometric methods such as the ESPI (electronic speckle pattern interferometry) or the shearing technique can be used to determine the areas of displacement or expansion of a test object having a randomly scattering surface. The desired result and the required resolution or rigidity of the test object relative to the magnitude of the applied forces determine which method can be used with a given test object. For the above-mentioned test methods, two states of the test object are normally compared during a static test in that the object is recorded at two different states of stress and the interferograms for the two states are subtracted. Depending on the measuring principle used, the resulting difference interferogram represents either the displacement or the expansion of the object between the two states in the form of interference lines. The amount of the displacement or expansion at one picture point in the difference interferogram can then be determined, for example, through counting the interference lines, starting with a picture point with known displacement or expansion and by taking into account the wave length for the light that is used.

If the sensing head is provided with a phase shifting unit, an expanded evaluation based on the principle of the phase shifting method can be carried out (W. Osten, "DIGITALE VERARBEITUNG UND AUSWERTUNG VON INTERFERENZ-BILDERN" [Digital Processing And Evaluation Of Interference Patterns], Chapter 6, Publishing House Akademie Verlag ISBN 3-05-501294-1). In the process, phase pictures are created, which assign a specific phase angle to each picture point. If the phase pictures of two object states are subtracted, a phase difference picture is obtained. In contrast to the above-mentioned difference interferogram, the phase difference picture does not show sinusoidal modulated interference lines, but shows directly the phase angle between the second and the first state. A further advantage of this representation is that the phase angle is standardized, owing the computing rule used for the phase shifting method. That is to say, the gray value that corresponds in a phase picture with a phase angle is always constant, independent of the picture coordinate. The disadvantage of the phase shifting method is that during the feeding in of the picture sequence that is required for the phase shifting method, the test object must be absolutely still. To avoid this disadvantage, a test method has been developed (see German Patent Specification 3843396 C1), which is known under the designation "direct phase measurement" or "spatial phase shifting method." This method only requires a grid projection or a camera picture for computing $2\pi$ modulated phase pictures.

To make an evaluation of the phase difference pictures easier for the examining person, the pictures should advantageously be processed in such a way that the defects are clearly visible to said person. For this, it is particularly useful to eliminate the frequently occurring whole-body movements or other non-relevant global object deformations, which are superimposed on the local deformations in order to facilitate the detection of local structural features, particularly structural defects.

German Patent 19501073 A1 "BILDVERARBEITUNGSVERFAHREN ZUR ERMITTLUNG DER STRUKTURFESTIGKEIT EINES PRÜFOBJEKTS MIT DIFFUS STREUENDER OBERFLÄCHE" [Picture Processing Method For Determining The Structural Stability Of A Test Object Having A Randomly Scattering Surface] describes an evaluation method for phase pictures used in shearography and designed to process local defects so that they are clearly visible to the examining person. For this, the phase difference picture is initially stabilized, is displaced in the picture processing system by a fixed amount $\Delta X$, and the displaced picture and the non-displaced picture are subtracted from each other. In the most favorable case, the error is thus displayed with dual amplitude. However, this method has considerable disadvantages. A demodulation or stabilization of the phase-difference picture is necessary. For the demodulation, the initially unknown $2\pi$ offset of the determined $2\pi$ modulated phase angle is reconstructed for each picture point in that the environment is examined for specific continuity characteristics. However, this procedure is subject to errors, wherein a demodulation error that occurs only once will propagate throughout its environment during a further demodulation. Error values that differ considerably from $\Delta X$ furthermore have exactly the opposite result of that which is intended because the amplitude distribution within the error is smaller than before.

Starting with this state of the technology, it is the object of the invention to specify a method for determining structural features of test objects having a randomly scattering surface, which method generates a result picture, in which the originally existing global deformations are removed. As a result, the examining person can easily detect locally limited structural features, particularly structural defects, in surveyed test objects.

SUMMARY OF THE INVENTION

The above object is achieved with the method according to the invention described below wherein advantageous modifications are specified and described.

According to the invention, the surface of the object to be examined is illuminated with coherent or structured light and is monitored with a camera, which is preferably a CCD video camera. The test object is subjected to different stresses to examine its structural characteristics. These stresses can include pressure, tension, bending or other types of stresses. The displacements or expansion of the object surface, caused by the various stresses, are recorded on the camera picture sensor as intensity modulation in the images of the object to be surveyed, caused by interferometry or structured light (e.g. streak pattern). With the speckle measuring techniques, for example, the deformation of the object surface is recorded as sinusoidal intensity modulation (sinusoidal intensity curve) of the speckles near the object that are imaged on the picture sensor. The images generated on the picture sensor of the monitoring camera are supplied to a picture processing system for further processing. Preferably, this is a digital picture processing system. A phase difference picture that shows the displacement or the stress/expansion state of the object is generated from the images that are produced and stored in the picture processing system. The phase difference picture shows for each point the difference between the phase angle of the light impinging on the picture sensor for one state of stress and the phase angle of the light impinging on the picture sensor for a different state of stress. A phase shifting process can be used, for example, to generate the phase difference picture.

According to the invention, a copy of the phase difference picture is generated, which is manipulated relative to the original phase difference picture in such a way that the structural features are removed or at least strongly suppressed. The manipulated copy of the phase difference picture is subsequently linked to the original phase difference picture. By using a suitable link, preferably the subtraction of the manipulated copy of the phase difference picture from the original phase difference picture, a phase difference picture results for which global deformations, whole-body movements or setting operations are eliminated. In contrast, the structural features eliminated in the manipulated phase difference picture continue to exist completely or nearly completely in the resulting phase difference picture.

In accordance with one advantageous modification of the invention, a low-pass filter is used to remove the structural features in the manipulated phase difference picture, since significant structural features, particularly structural defects, typically appear as local extreme values with little expansion of area in the phase difference picture. In order to manipulate the phase picture by means of a low-pass filter, this picture is preferably first divided into a sine picture and a cosine picture. For this, the sine value and the cosine value are computed point-by-point from the phase value and are filed as a sine picture and a cosine picture. As a result of this transformation, two sinusoidal modulated streak pictures are obtained from the phase picture. In contrast to the phase picture, these streak pictures do not show any locations of unsteadiness in the form of phase jumps and are thus suitable for a low-pass filtering. Following the low-pass filtering, the phase picture can be computed anew from the sine picture and the cosine picture by using the function of arc cotangent.

In order to eliminate the structural features in the manipulated phase difference picture, the low-pass must be selected strong enough so that the largest features to be expected are for the most part eliminated. If a filtering matrix is used according to one embodiment of the invention, then the filtering matrix is selected to be approximately as large as the largest expected structural feature. With a standard camera resolution, for example according to the CCIR Standard with 768×576 pixels, and a maximum size for the structural features of 10% of the picture size, the size of the filtering matrix is thus approximately 76×76. The filtering with such a large filtering matrix requires a considerable amount of time, even with state of the art computer systems, especially since the filtering takes place on the sine picture as well as the cosine picture. In accordance with another embodiment of the invention, a recursive low-pass filter can alternately be used. The advantage of this filter is that regardless of the selected filter strength, the filtered value of a picture point can be computed respectively only from the picture point in the preceding column and the preceding line, as seen in filtering direction. In contrast to most other filters, the filtered value is re-recorded into the picture with the recursive low-pass and is used again for the following picture point to be filtered (thus the term "recursive"). The linking to the picture point of the preceding column or the preceding line occurs based on the following formulas:

Linking to the preceding column:

$$I'(x,y)=(1-k)\times I(x\times 1, y)+k\times I(x,y)$$

Linking to the preceding line:

$$I'(x,y)=(1-k)\times I(x,y-1)+k\times I(x,y)$$

With:
x: column coordinate for the picture point
y: line coordinate for the picture point
I(x, y): original intensity value at the picture point (x, y)
I'(x,y): filtered intensity value at the picture point (x, y)
I(x−1,y): intensity value of the picture point in the preceding column in filtering direction
I(x,y−1): intensity value of the picture point in the preceding line in filtering direction
k: filtering intensity (real number at interval ]0 . . . 1[)

The picture is increasingly distorted if the recursive low-pass filter is adjusted to be extremely strong (that is to say k is near 0), meaning the picture is also geometrically distorted in addition to the desired low-pass effect. In order to minimize these effects and according to one embodiment of this filtering method, the filter is used repeatedly with a lower intensity (meaning a higher k value). In the process, the filtering is started from different corner points of the picture to be filtered, so that the geometric distortions are for the most part compensated.

One exemplary embodiment of the invention is explained in the following with the aid of drawings.

DESCRIPTION OF THE PREFERRED EMBODIMENTS

Figure 1:
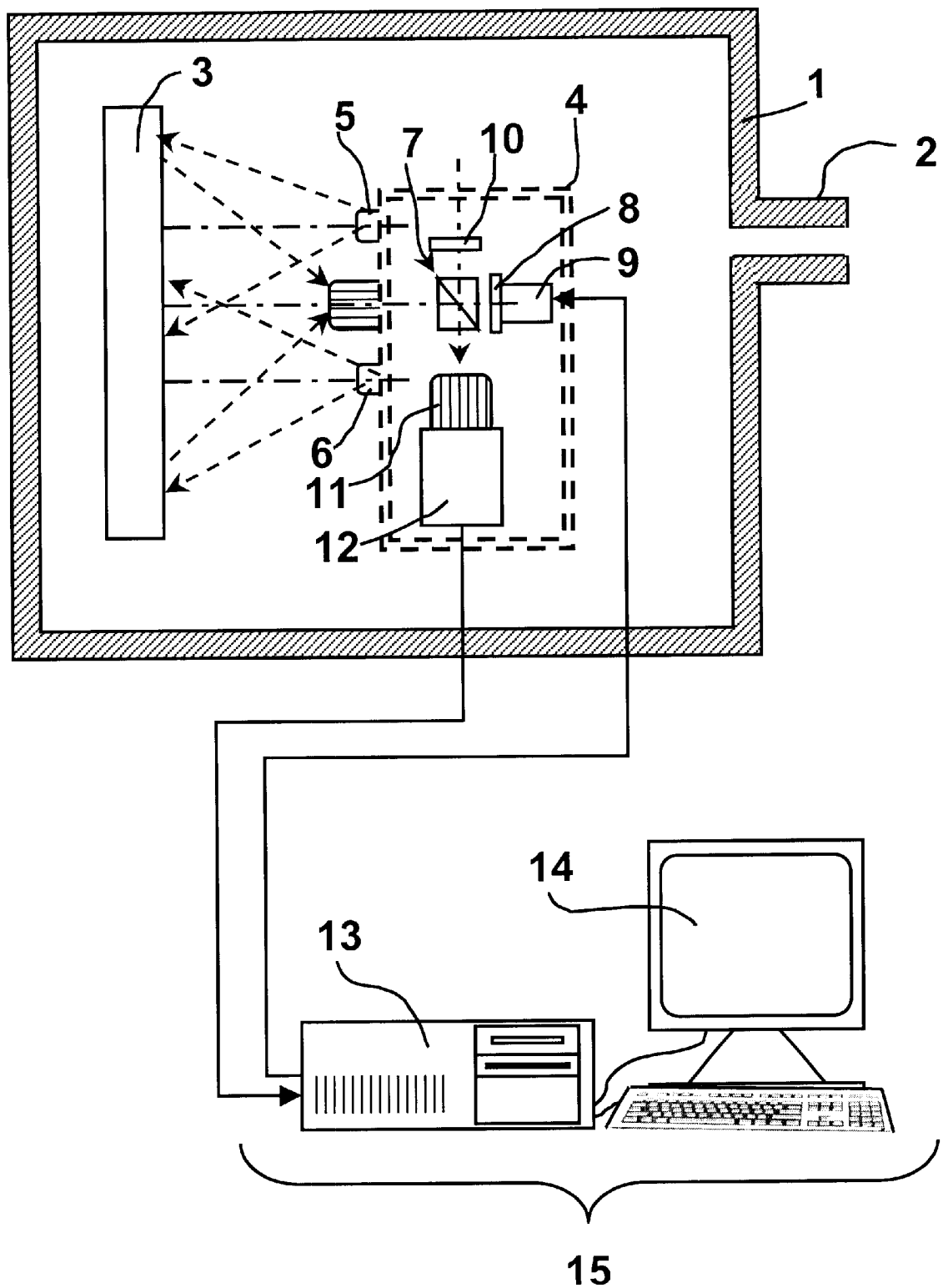
FIG. 1 is a standard testing device for determining structural defects by means of the shearing technique.

FIG. 1 shows an arrangement for testing a component 3 by means of shearography. The component 3 is tested with negative pressure, wherein a change in the state of component 3 occurs through a pressure change. For this, the component 3 is located together with the shearography measuring head 4 inside a negative pressure chamber 1, which can be evacuated via the connecting piece 2. The component 3 is illuminated with coherent light by means of light sources 5 and 6. The light, which is randomly scattered back by the component 3, is divided into two partial beams in a Michelson Interferometer 7. The two mirrors 8 and 10 of the Michelson Interferometer 7 are arranged such that two mutually offset images of component 3 are created on the picture sensor of camera 12 (shearing effect). The mirror 8 is mounted on a piezo actuator 9 so that a phase shifting process can be carried out. The camera 12 is connected to the picture processing system 15, which consist of a computer with picture feed-in card 13 and monitor 14. The picture processing system furthermore assumes the actuation of the piezo actuator 9.

Figure 2A:
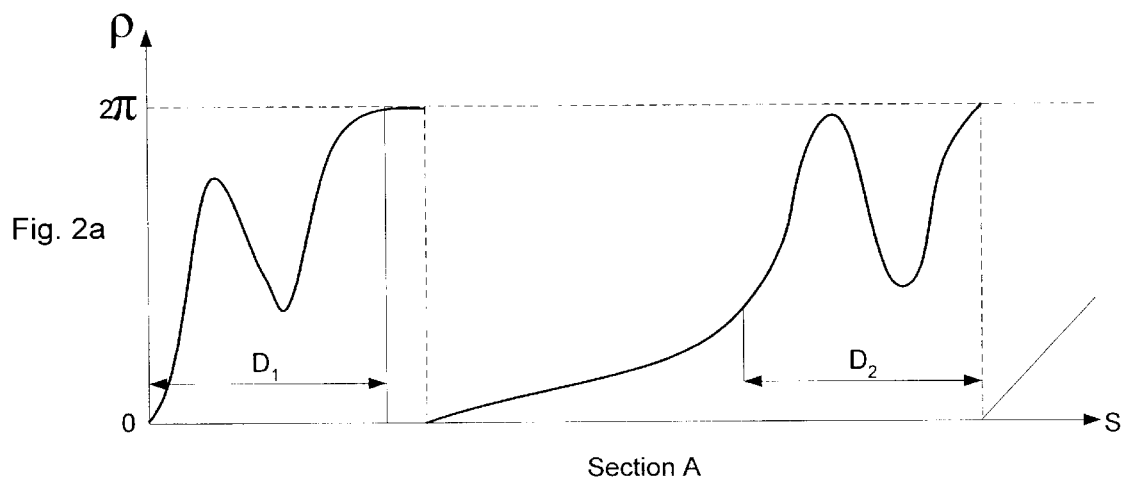
FIGS. 2a–2c show the process steps with the aid of intersecting line images.
Figure 2B:
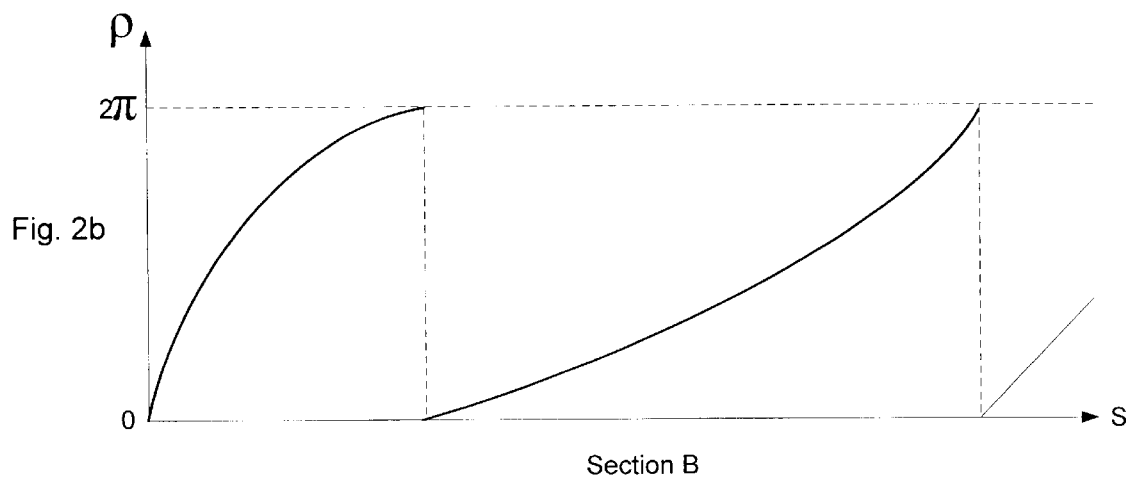
Figure 2C:
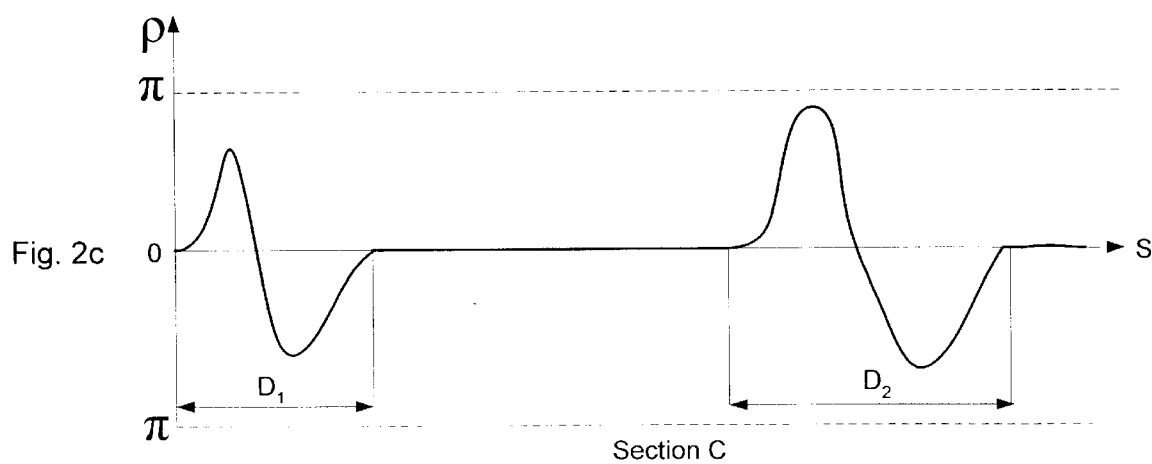

FIGS. 2a–2c schematically show the individual process steps with the aid of intersecting line pictures, for which the intensity or the phase difference angle is plotted above the pixel coordinate. All three intersecting lines run along the same picture coordinates and are $2\pi$ modulated. Intersecting line A (FIG. 2a) shows a section through the unprocessed phase difference picture, created by means of the shearing interferometer 7. Two local structural features D1 and D2 are visible. The intersecting line A furthermore shows a global deformation. Intersecting line B (FIG. 2b) shows a section following a low-pass filtering of the phase picture. The local structural features D1 and D2 were removed through the low-pass filtering, leaving only the global deformation. Intersecting line C (FIG. 2c) finally shows a section through the resulting phase difference picture, which is generated through subtracting the filtered phase difference picture from the original phase difference picture. The zero point is furthermore shifted by adding a constant gray value to an average gray value, so that instead of the interval 0 to $2\pi$, the interval $-\pi$ to $\pi$ with continuously increasing gray values is shown.

Figure 3:
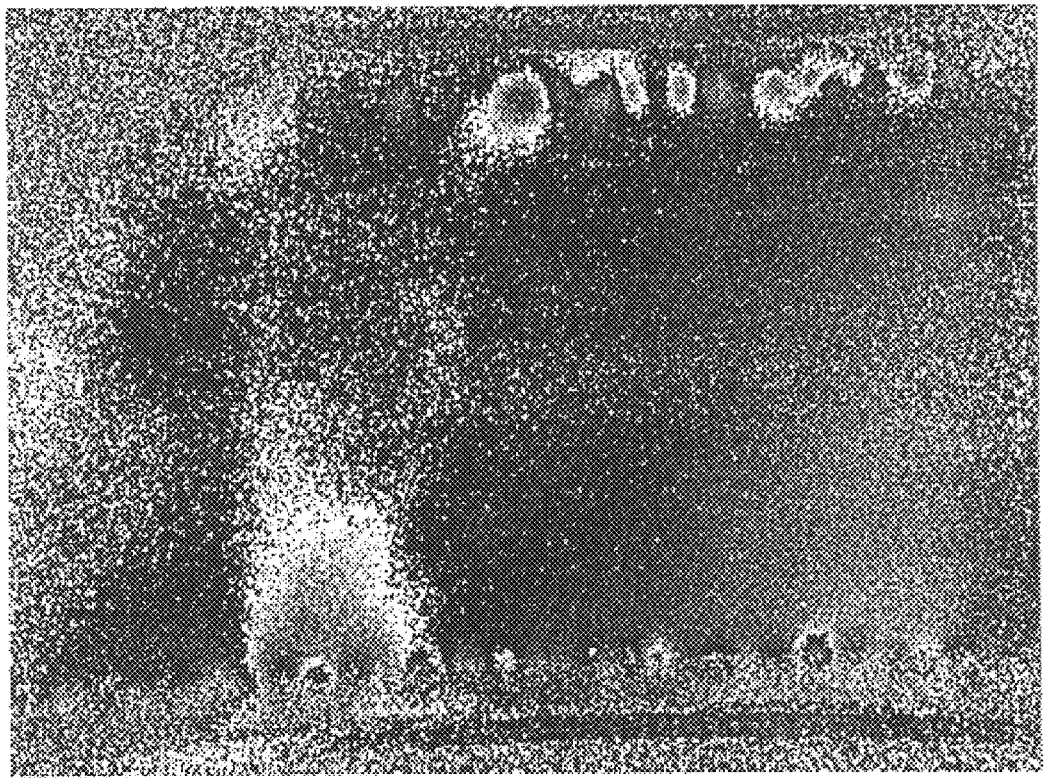
FIG. 3 is a phase difference picture, generated by means of the testing device shown in FIG. 1, which shows local structural defects, super-imposed by a global deformation.

FIG. 3 shows a phase difference picture of component 3, wherein the component is photographed at two different pressure stages. Shown in the upper and lower region of the phase difference picture are structural defects in the form of material separations that are occluded in the component and lead to bumped-out areas due to the negative pressure. A global bulging of the component, caused by a setting operation due to pressure changes is superimposed on these structural defects. The global deformation makes it more difficult to detect the structural defects and, in particular, the automatic detection of errors, e. g. by means of a threshold-value operation.

Figure 4:
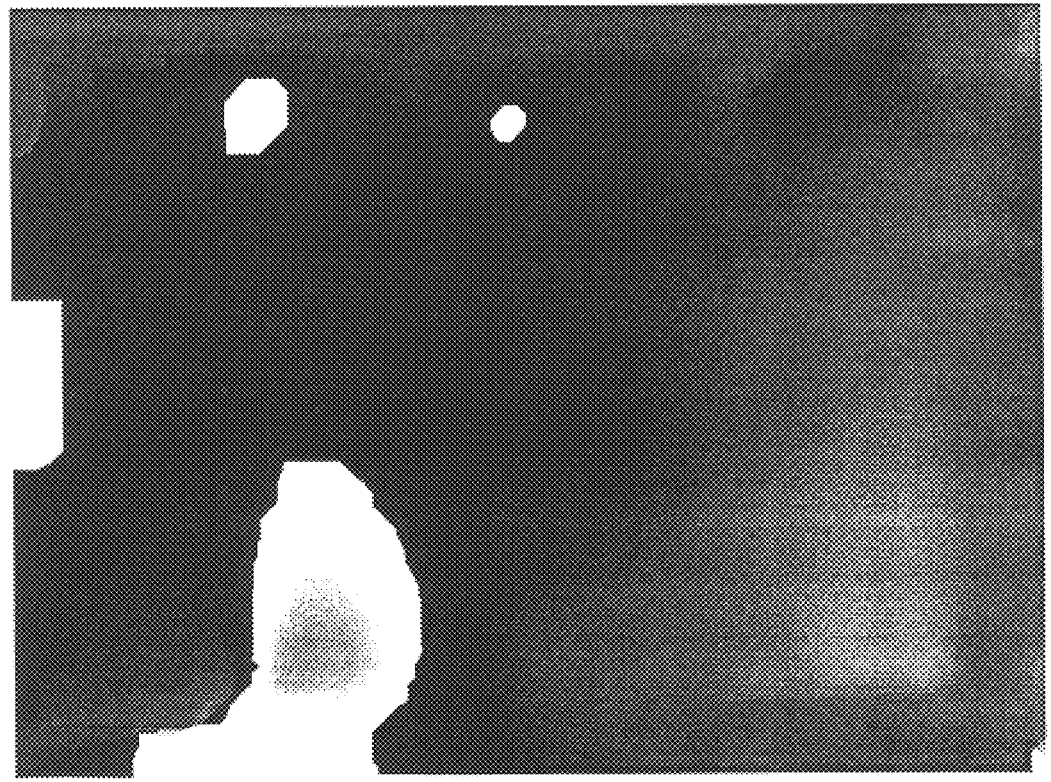
FIG. 4 shows the phase difference picture shown in FIG. 3, which was subjected to a strong recursive low-pass filtering to remove the local structural defects.

FIG. 4 shows the phase difference picture from FIG. 3, which was manipulated by means of a strong recursive low-pass filtering. As a result of the strong filtering, the local structural defects of the original phase difference picture shown in FIG. 3 are no longer visible.

Figure 5:
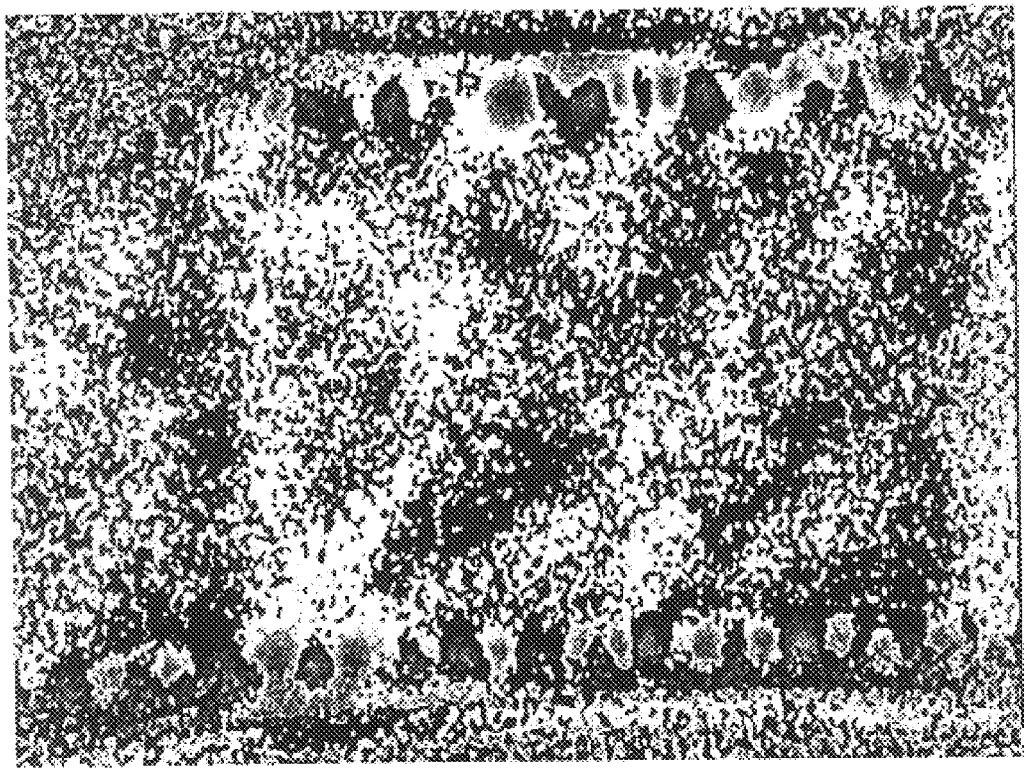
FIG. 5 illustrates the phase difference picture shown in FIG. 3, from which the filtered phase difference picture in FIG. 4 was subtracted.

FIG. 5 shows the difference picture between the phase difference picture in FIG. 3 and the low-pass filtered phase difference picture in FIG. 4. For this, the gray values of the filtered phase difference picture were subtracted point-by-point from those of the original phase picture. One can clearly see that the global deformation visible in the original phase difference picture is eliminated since only slight fluctuations around the zero-angle position are visible outside of the structural defects. Small positive deviations from zero are shown with very dark gray tones and small negative deviations from zero are shown with very light gray tones.

Figure 6:
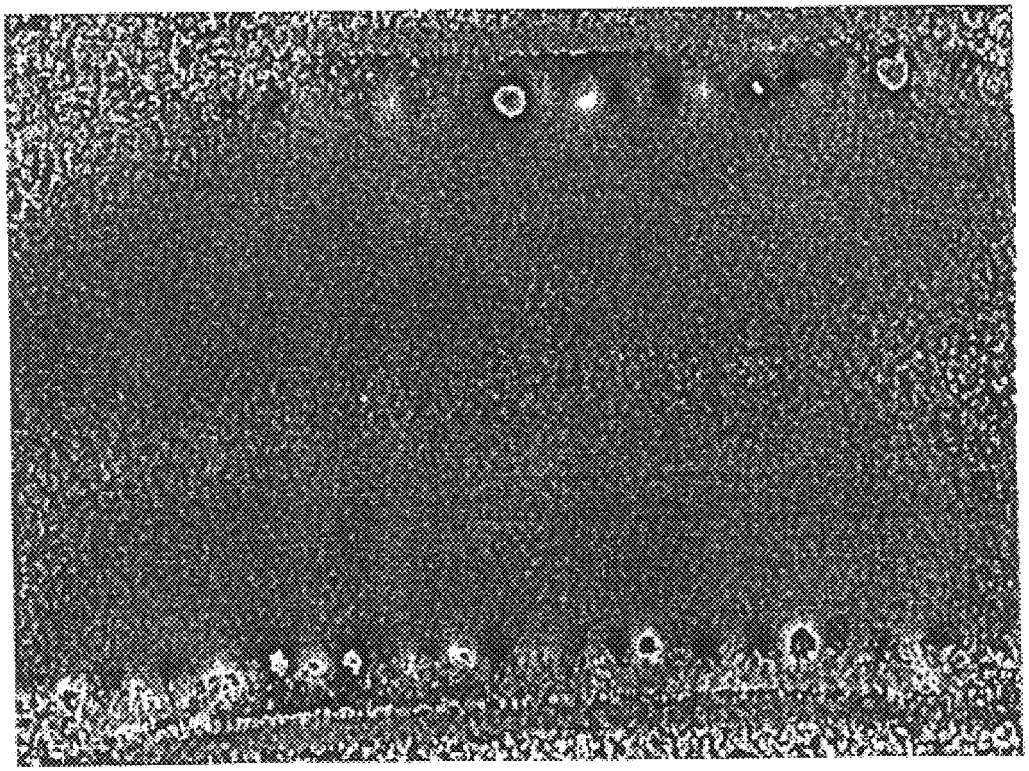
FIG. 6 shows the phase difference picture shown in FIG. 5, following the shifting of the zero-angle position to an average gray value.

FIG. 6 shows the resulting phase difference picture from FIG. 5. However, the zero-angle position was shifted to the center position between the brightest and the darkest gray value that can be displayed, so that the areas outside of the structural defects are shown with uniform, average gray values. This zero-point shifting is not important to the result values or the phase differences, to be sure, but improves the visual impression considerably. All structural defects are now clearly visible.

Figure 7:
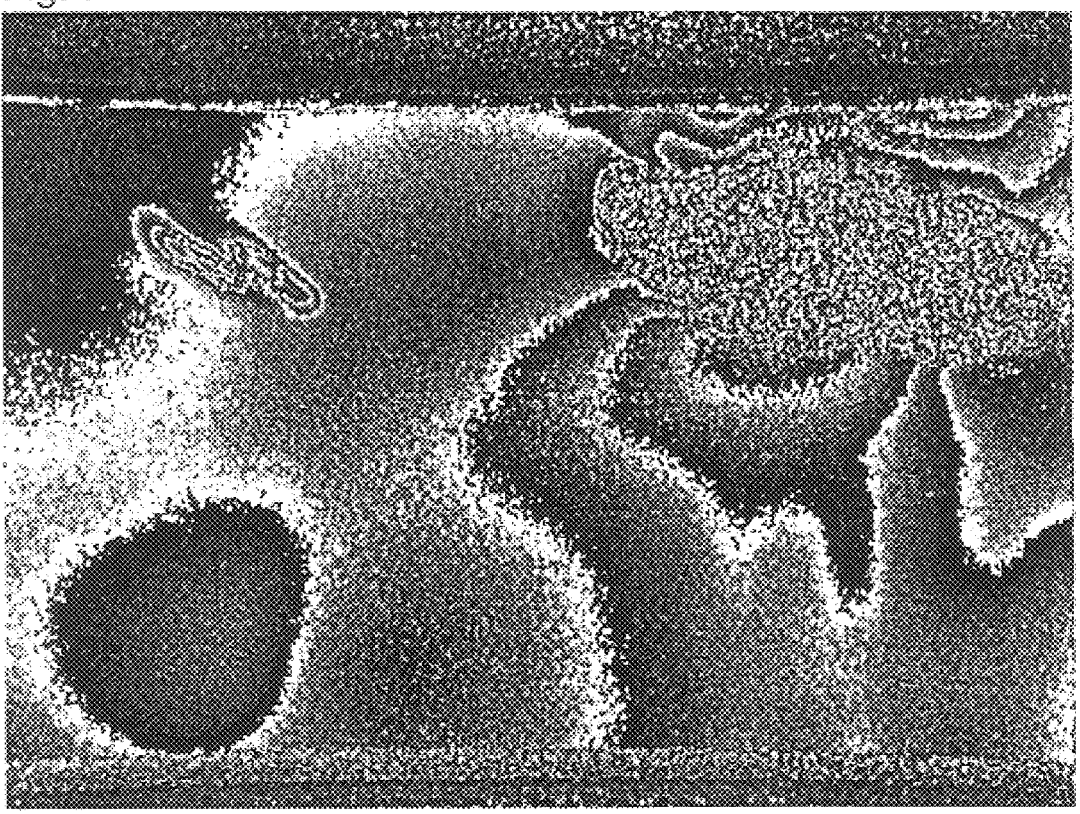
FIG. 7 shows a phase difference picture of another test object, generated with the testing device as shown in FIG. 1, which shows local structural defects with a superimposed global deformation.
Figure 8:
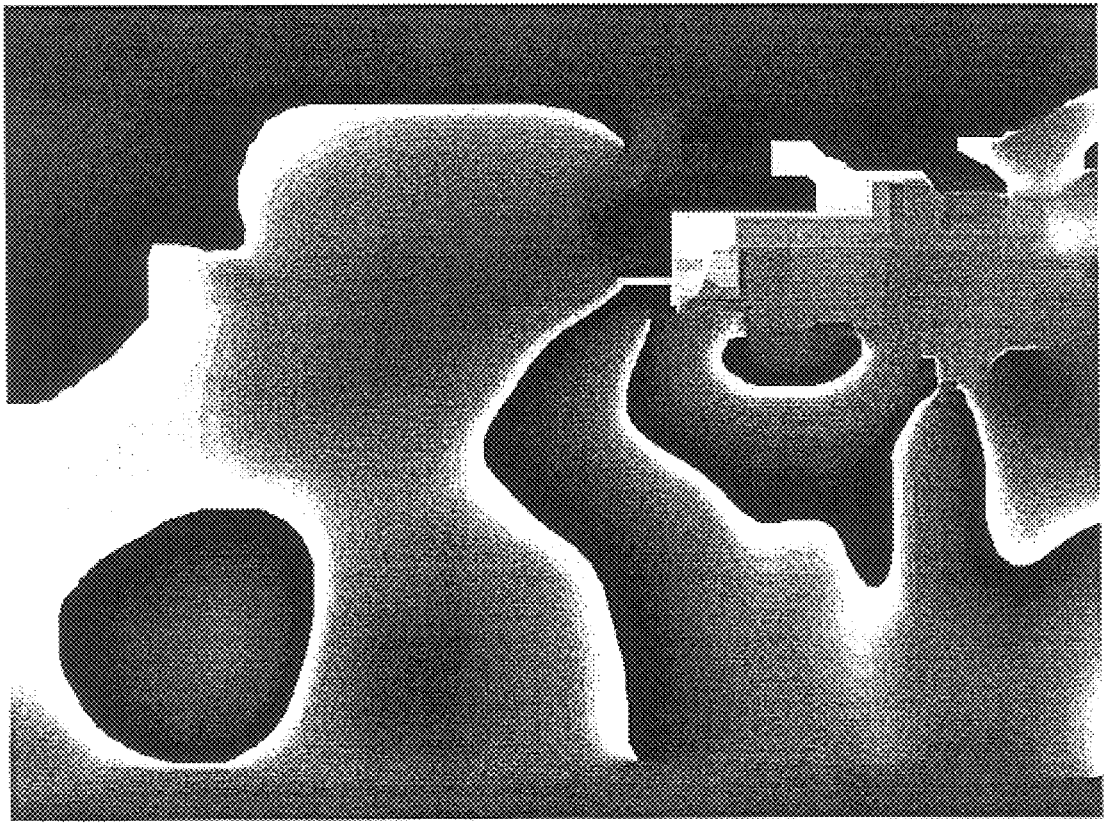
FIG. 8 shows the phase difference picture shown in FIG. 7, which has been subjected to a strong recursive low-pass filtering to remove the local structural defects.
Figure 9:
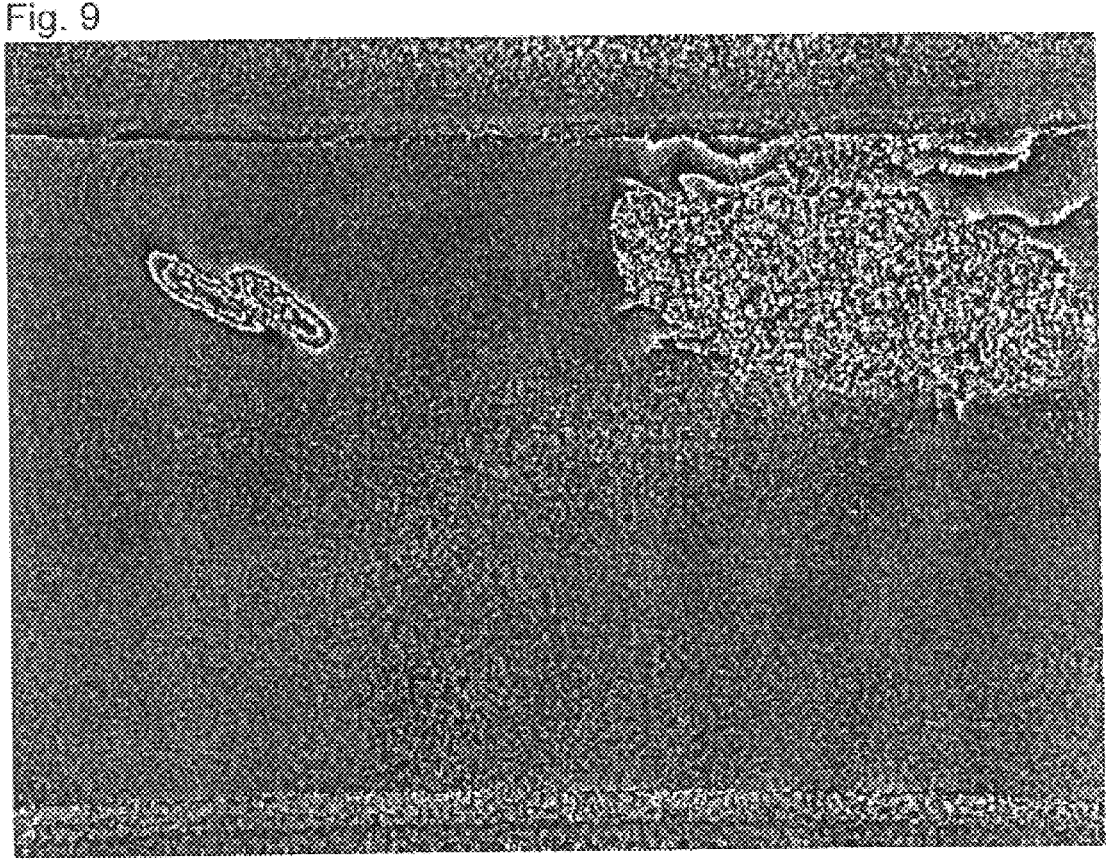
FIG. 9 shows the phase difference picture shown in FIG. 7, from which the filtered phase difference picture shown in FIG. 8 was subtracted, following the shifting of the zero-angle position to an average gray value.

Another example follows from the FIGS. 7 to 9. FIG. 7 illustrates the phase difference picture obtained with shearography, which is known per se, wherein the respective component was recorded at two different pressure stages (stresses). In the upper right and left areas of the phase difference picture, structural defects appear in the form of material separations occluded in the component, which result in bumped-out locations due to the negative pressure. A global bulging of the component, caused by a setting operation due to pressure changes, is superimposed on the structural defects. This global deformation makes it more difficult to detect the structural defects and, in particular, makes an automatic detection of errors by means of threshold-value operations more difficult.

The individual process steps for the further processing correspond to the process steps illustrated in FIG. 2. The result picture according to FIG. 9 does not show the total deformation of the component and emphasizes local deformations that indicate errors.

Figure 10:
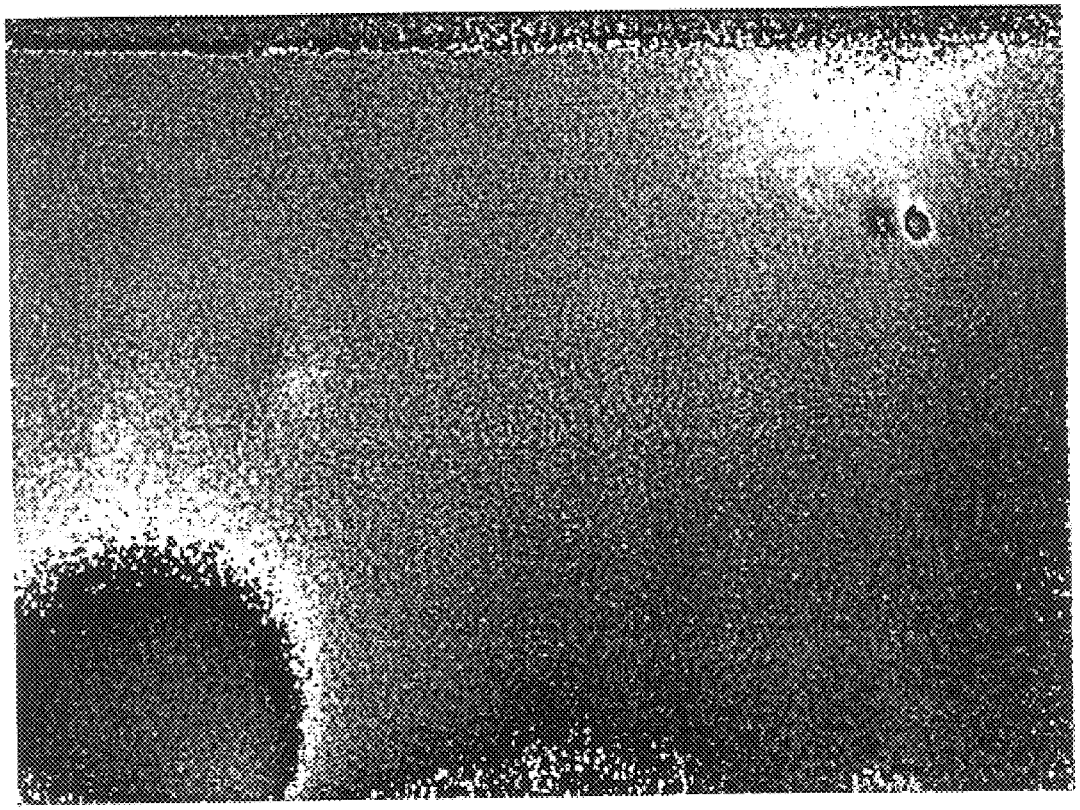
FIG. 10 is a phase difference picture for another test object, generated with the testing device shown in FIG. 1, which shows local structural defects with a superimposed global deformation.
Figure 11:
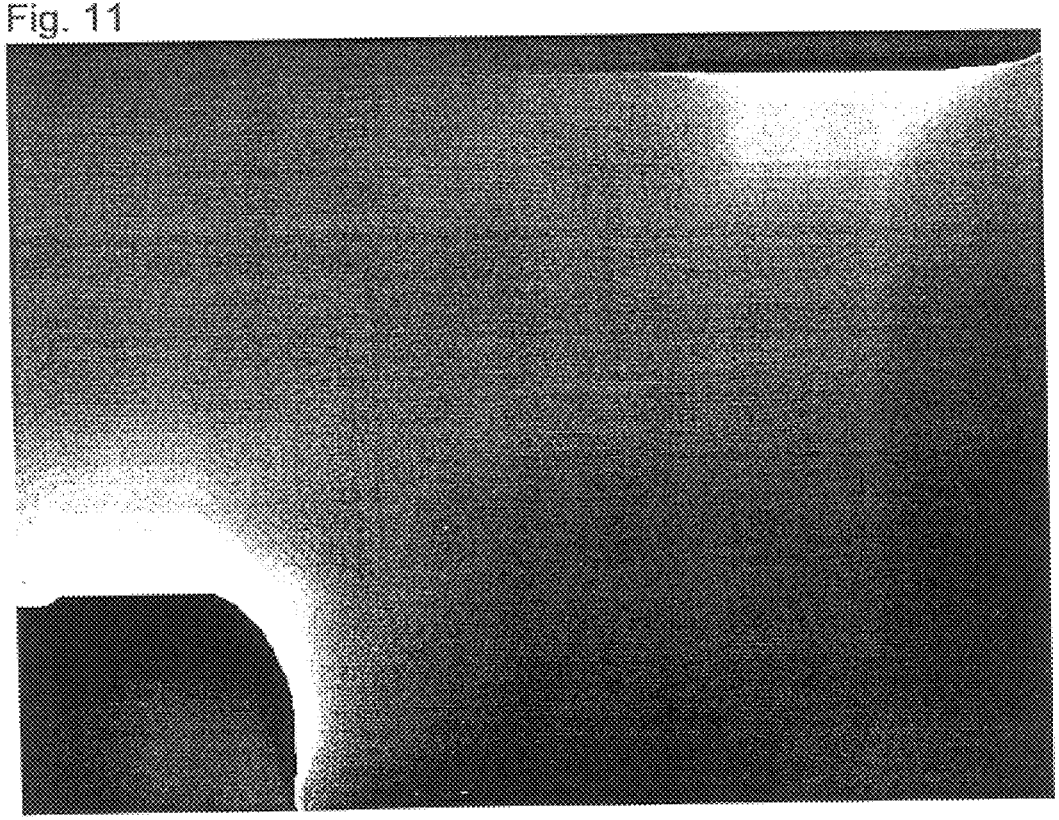
FIG. 11 shows the phase difference picture shown in FIG. 10, which has been subjected to a strong recursive low-pass filtering to remove the local structural defects.
Figure 12:
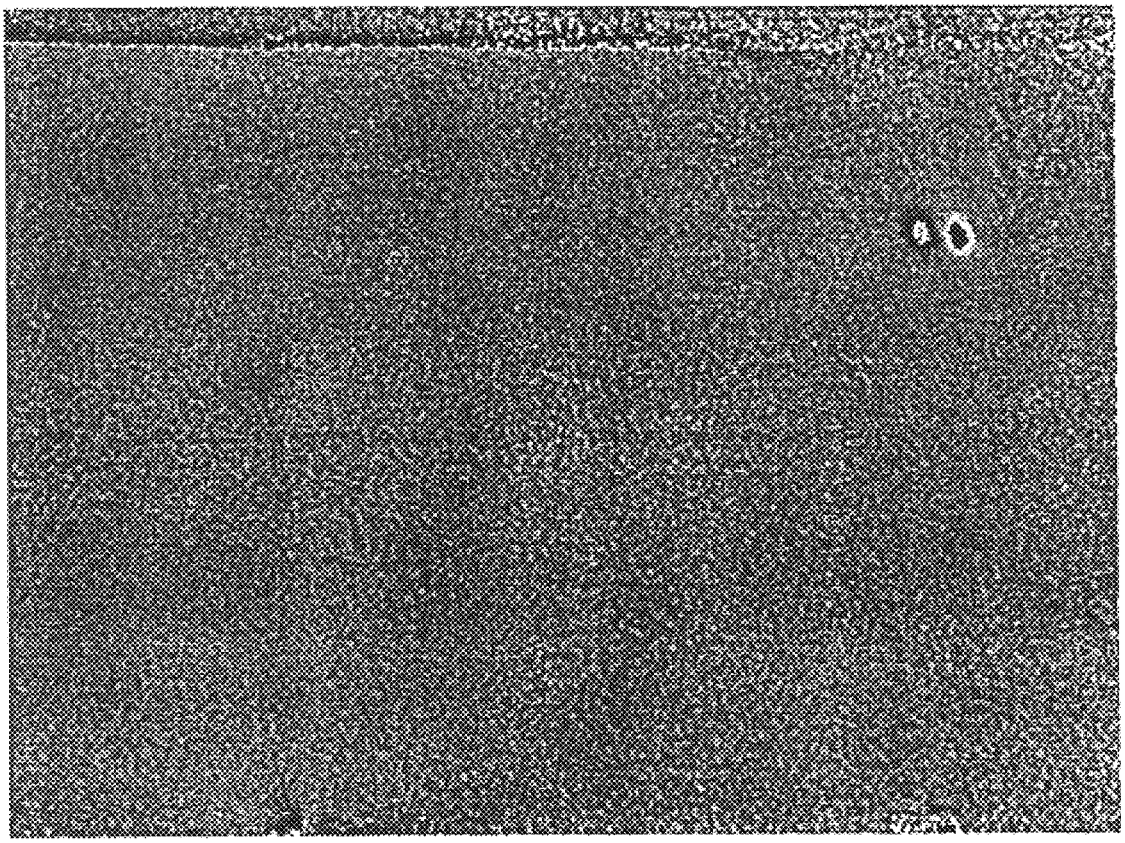
FIG. 12 shows the phase difference picture shown in FIG. 11, from which the filtered phase difference picture shown in FIG. 8 was subtracted, following a shifting of the zero angle position to an average gray value.

Another example can be found in FIGS. 10 to 12. The picture processing shown therein fades out a large-area deformation, which results in a dominant black spot on the lower left side in the phase picture according to FIG. 10. The structural defect on the upper right side remains, as shown in FIG. 12, and is emphasized even further.

What is claimed is:

1. A method of determining structural features of test objects having a randomly scattering surface, comprising:

illuminating the object surface with coherent or structured light, monitoring the test object with a camera, subjecting the test object to various stresses, detecting the shifting or the expansion of the object surface, caused by different stresses, in the images of the object to be measured on the picture sensor of the camera as intensity modulation generated through interferometry or through the structured light, supplying the images produced on the picture sensor to a picture processing system for further processing, generating the shifting or the stress/expansion state of the phase difference picture representing the object by the picture processing system from the produced images;

generating a copy of the phase difference picture;

manipulating the generated copy relative to the original phase difference picture such that the structural features are removed or at least suppressed;

linking the manipulated copy of the phase difference picture to the original phase difference picture; and generating a resulting phase difference picture through this linking.

2. A method according to claim 1, including linking the manipulated copy of the phase difference picture to the original phase difference picture by subtracting the manipulated copy of the phase difference picture from the original phase difference picture.

3. A method according to claim 1, including removing the structural features in the phase difference picture to be manipulated using a low-pass filtering.

4. A method according to claim 3, including: for the low-pass filtering of the phase difference picture, computing the sine and cosine pictures of the phase difference picture, filtering the respective sine and cosine pictures with a low-pass filter, and computing another phase difference picture from the filtered sine and cosine pictures.

5. A method according to claim 4, including using a filtering matrix for the low-pass filtering, and selecting the size of which the matrix such that the largest structural characteristic to be expected is sufficiently suppressed.

6. A method according to claim 4, including using a recursive low-pass filter for the low-pass filtering.

7. A method according to claim 6, including utilizing the recursive low-pass filter repeatedly and starting from different corner points of the pictures to be filtered.

8. A method according to claim 1, including: for the manipulation or low-pass filtering of the phase difference picture, subjecting the phase difference picture to be manipulated or the sine and cosine pictures to be developed thereof to a Fourier Transformation; and carrying out the manipulation or low-pass filtering in the Fourier spectrum.

9. A method according to claim 1, including stabilizing the resulting phase difference picture in an additional evaluation step.

10. A method according to claim 1, including: in the resulting phase difference picture, shifting the zero-angle position of the phase differences to an average gray value, and showing slight fluctuations around the zero-point position with continuously increasing or decreasing gray values.

11. A method according to claim 1, including showing the gray values in the resulting phase difference picture in color.

* * * * *